United States Patent
Chiang

(10) Patent No.: US 8,068,867 B2
(45) Date of Patent: Nov. 29, 2011

(54) CROSS-LAYER POWER CONTROL AND SCHEDULING PROTOCOL

(75) Inventor: Mung Chiang, Cherry Hill, NJ (US)

(73) Assignee: Empire Technology Development LLC, Wilmington, DE (US)

( * ) Notice: Subject to any disclaimer, the term of this patent is extended or adjusted under 35 U.S.C. 154(b) by 391 days.

(21) Appl. No.: 12/416,160

(22) Filed: Apr. 1, 2009

(65) Prior Publication Data
US 2010/0255798 A1 Oct. 7, 2010

(51) Int. Cl.
*H04B 7/00* (2006.01)
(52) U.S. Cl. .................................. 455/522; 455/127.1
(58) Field of Classification Search .................. 455/522, 455/127.1, 515, 500, 452.2, 454, 450, 453.3, 455/445, 561; 370/411, 468, 210
See application file for complete search history.

(56) References Cited

U.S. PATENT DOCUMENTS
7,158,804 B2 * 1/2007 Kumaran et al. ............. 455/515

OTHER PUBLICATIONS

Mung Chiang, Prashanth Hande, Tian Lan, Chee Wei Tan, Power Control in Wireless Cellular Networks, Foundations and Trends in Networking sample, 2008, p. 1-156, vol. 2, 4 issues, now Publishers Inc., Massachusetts, USA.

Yung Yi, Alexandre Proutiere, Mung Chiang, Complexity in Wireless Scheduling: Impact and Tradeoffs.
Tamer Eibatt, Member, IEEE, and Anthony Ephremides, Fellow IEEE, Joint Scheduling and Power Control for Wireless Ad Hoc Networks, IEEE Transactions on Wireless Communications, Jan. 2004, p. 74-85, vol. 3, No. 1.
R. L. Cruz and Arvind V. Santhanam, Optimal Routing, Link Scheduling and Power Control in Multi-hop Wireless Networks, IEEE INFOCOM 2003.
Gerard J. Foschini, Fellow, IEEE, and Zoran Miljanic, Student Member, IEEE, A Simple Distributed Autonomous Power Control Algorithm and its Convergence, IEEE Transactions on Vehicular Technology, Nov. 1993, p. 641-646, vol. 42, No. 4.
Yih-Hao Lin and R. L. Cruz, Power Control and Scheduling for Interfering Links, Oct. 24-29, 2004, p. 288-291.

* cited by examiner

*Primary Examiner* — Joseph Lauture
(74) *Attorney, Agent, or Firm* — Ren-Sheng International

(57) ABSTRACT

A cross-layer protocol may generally provide joint control of power and schedule in a fully distributed manner without any centralized coordination for an interference-limited wireless network. Under the described protocol, each wireless device may use a detection trial to locally detect interference condition and randomly back off in a distributed manner. Based on the result of the detection trial, the wireless device may then shift between (1) a pure power control mode with power control and (2) a time sharing mode with joint power and scheduling control. The wireless device may also use the amount of backlog in its queue buffer to determine the duration of a silence period in the time sharing mode and an increment to the power level provided by the power control algorithm.

29 Claims, 5 Drawing Sheets

CROSS-LAYER POWER CONTROL AND SCHEDULING PROTOCOL

BACKGROUND

Description of the Related Art

Unless otherwise indicated herein, the approaches described in this section are not prior art to the claims in this application and are not admitted to be prior art by inclusion in this section.

A wireless cellular network may include cells serviced by base stations. When a mobile station is within a cell, it communicates with a base station to transmit and receive calls and data. Multiple mobile stations in the same cell may cause unwanted interference with each other when they attempt to transmit calls and data to the same base station.

In the wireless cellular networking industry, revenue depends on the number of active users a service provider can support at any given time and the Quality of Service (QoS) provided to them. Interference management becomes critical as the number of active users rises. Any easy-to-manage, backward-compatible method that better manages the precious radio resources and accommodates more active users and more QoS terms into the same spectrum will substantially add to the revenue of the wireless network operator, therefore also becoming an attractive proprietary add-on technology from vendors of equipment and software to the wireless network operators.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
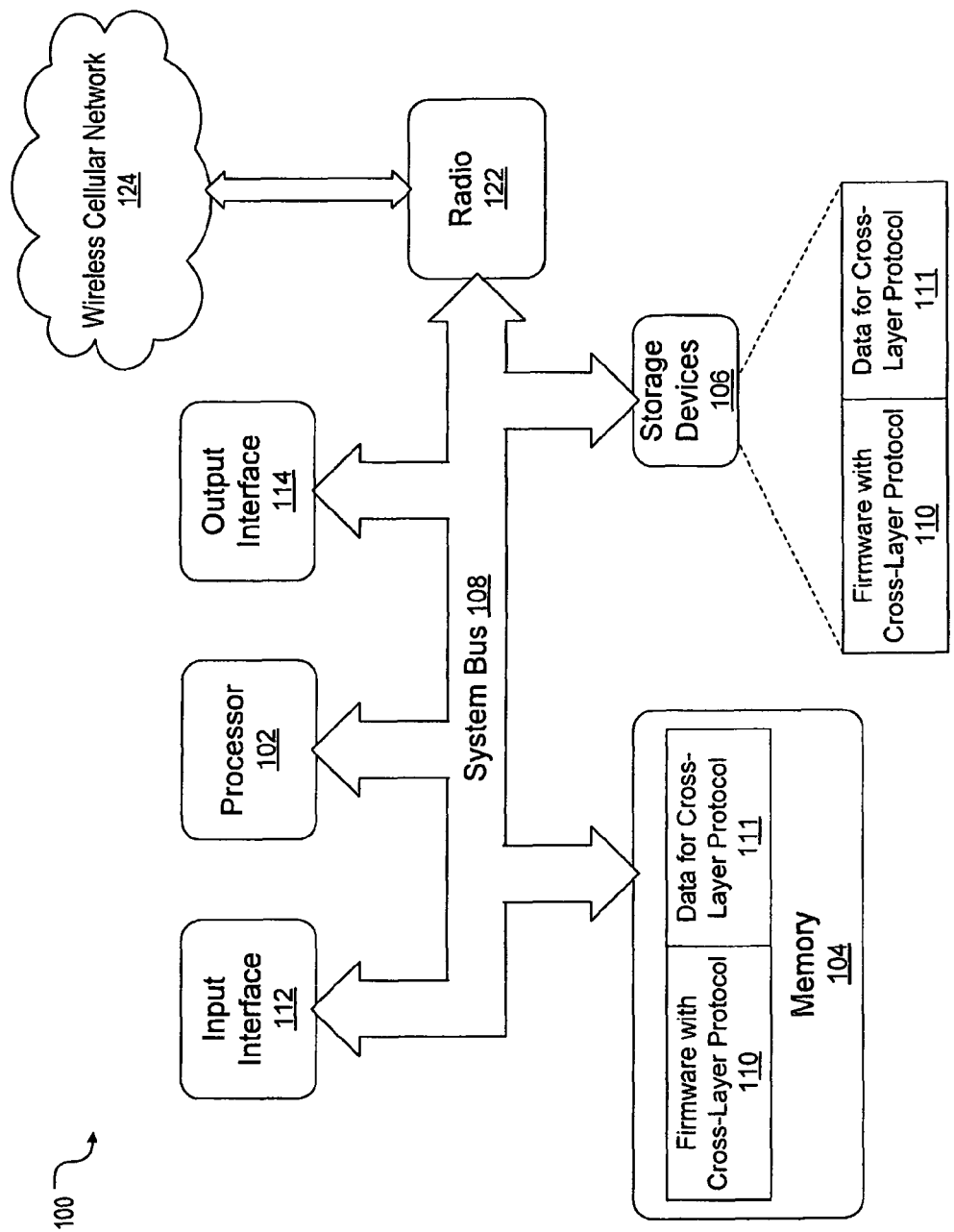
FIG. 1 illustrates an example mobile station for executing a cross-layer protocol.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to a cross-layer protocol that may provide joint control of power and schedule in a fully distributed manner without any centralized coordination for an interference-limited wireless network (e.g., a cellular network). The protocol may determine when and how loudly a wireless device (e.g., a mobile station or sender device) is to communicate with another wireless device (e.g., a base station or receiver device) in order to support more active users at a given time while providing the required Quality of Service (QoS). The protocol has three main features. First, each mobile station may use a detection trial to locally detect interference conditions and randomly back off in a distributed manner. Second, a mobile station may shift between (1) a pure power control mode with power control and (2) a time sharing mode with joint power and scheduling control based on the result of the detection trial. Third, each mobile station may further use the amount of backlog in its queue buffer to determine the duration of a silence period in the time sharing mode and an increment to the power level provided by the power control algorithm.

Before exploring embodiments of the cross-layer protocol, background on transmit power control and scheduling control for wireless networks is provided.

Transmit power control is an important functionality in wireless network design. Signal interference may be determined by a variety of factors such as the power vector, P, the channel gain matrix, G, which denotes G(i,j) entries for the channel gain from the transmitter of link j to the receiver of link i, and the noise vector, N. An expression for the Signal Interference Ratio (SIR) may be written as:

$$SIRi=PiGii/(\text{sum\_}(j \text{ not equal to } i) \, PjGij+Ni), \text{ for all } i.$$

The present disclosure contemplates that basic power control problems may be classified into two major types: minimizing sum of powers subject to constraints on SIR, or maximizing some utility function of the achieved SIR subject to maximum power constraints. A conventional Distributed Power Control (DPC) algorithm may be employed to solve the first problem in wireless cellular systems. However, to manage interference in wireless networks, transmit power is one of the two major degrees of freedom. The other degree of freedom is the scheduling of transmissions.

As an analogy, think of a noisy cocktail party where sounds interfere with each other. To achieve the best state for everyone, two degrees of freedom can be explored: when should each person speak, and if one person speaks, at what volume should that person speak.

A simple view is to extend the basic power control models, both power minimization (for fixed SIR) and utility maximization (for variable SIR), by incorporating a new Boolean variable theta_{i}, indicating whether a mobile station i is scheduled to transmit or not. This may lead to a mixed integer nonlinear optimization problem, which is nearly impossible to solve in a distributed way.

Assuming that the timescale of scheduling is shorter than the coherent time, another possible formulation may be similar to joint power control and bandwidth allocation with interference spread, except now the portion of total bandwidth allocated may be replaced by the fraction of time allocated to each mobile station.

The present disclosure contemplates that neither of the above formulations completely captures the essence of joint power control and scheduling. Many conventional power control formulations assume that the objective is defined for the equilibrium state, and therefore must activate all mobile stations in its power control solutions or otherwise those mobile stations allocated with zero transmit power will be disconnected from the network. The present disclosure contemplates that to properly study joint power control and scheduling, a generalization of such formulations to allow limit cycles, rather than a single point, at the equilibrium, may be necessary.

Existing research literature often assumes the M-hop collision model (i.e., two nodes within M hops of each other cannot successfully transmit at the same time), which does not take into account that received SIR determines the amount of interference, nor the opportunity of varying transmit powers jointly with scheduling to increase stability region and the attained utility.

The present disclosure recognizes that both scheduling problem formulations (without power control) and power control problem formulations (without scheduling) are incomplete solutions. They represent two sides of one common issue, one by deciding when a subset of mobile stations can transmit and the other by changing the power with which a mobile station can transmit. Their unification remains an open problem. Starting with the scheduling part of the problem, SIR based interference models may lead to NP-hard (nondeterministic polynomial-time hard) problems. Starting with the power control part of the problem, neither convexity of power-controlled rate region nor distributed convexification is well-understood.

To fully understand joint control of power and scheduling, adequacy of power control should be determined without time-sharing, and scheduling for mobile stations should be determined when power control alone is inadequate. Here, the word "adequate" may be quantified by the optimality gap with respect to an objective function, e.g., cost function of power or utility function of rate. It also may be quantified by the size of stability region attained by an algorithm. Roughly speaking, when there are stochastic arrivals and departures of mobile stations each carrying a finite workload, stability region may be the set of arrivals that can be served by the system while keeping the queues finite.

The present disclosure analyzes the convexity property of the rate regions attained by power control algorithms and a scheduling algorithm for activating or silencing mobile stations in the right pattern when the rate region is non-convex.

FIG. 1 illustrates an example mobile station 100 for executing a cross-layer protocol in accordance with at least some embodiments of the present disclosure. Mobile station 100 may include a processor 102, memory 104, and one or more storage devices 106 coupled together by a system bus 108. Processor 102 may be a central processing unit (CPU), a micro-processor, a micro-controller, a digital signal processor (DSP) or any other appropriate processing unit. Memory 104 may include any appropriate variety of memory such as random access memory (RAM), dynamic RAM (DRAM), static RAM (SRAM), flash memory, read-only memory (ROM), or any other appropriate memory device. Storage devices 106 may be a disk type of device such as a hard disk drive (HDD), a flexible disk drive, a compact disk (CD), a digital versatile disk (DVD) or a non-disk type of device such as a flash-memory type of device. Storage devices 106 and their associated computer storage media may provide storage of computer readable instructions, data structures, program modules and other data for mobile station 100. Storage devices 106 can include a firmware 110 with the cross-layer protocol and data 111 for the cross-layer protocol. Processor 102 may load firmware 110 with the cross-layer protocol into memory 104, execute firmware 110 to modify data 111 for the cross-layer protocol, and save data 111 in storage devices 106.

Mobile station 100 may further include one or more of an input interface 112, an output interface 114, and a radio 122 coupled to processor 102 via system bus 108. Commands and data may be received from input devices through input interface 112. Input devices may include a microphone, a keypad, a touch screen, or a pointing device such as a mouse, a trackball, or a touch pad. Visual and audio outputs may be provided through output devices via output interface 114. Output devices may include a display and a speaker. Mobile station 100 may use radio 122 to send and receive call and data to a base station in a cellular telephone network 124.

Figure 2:
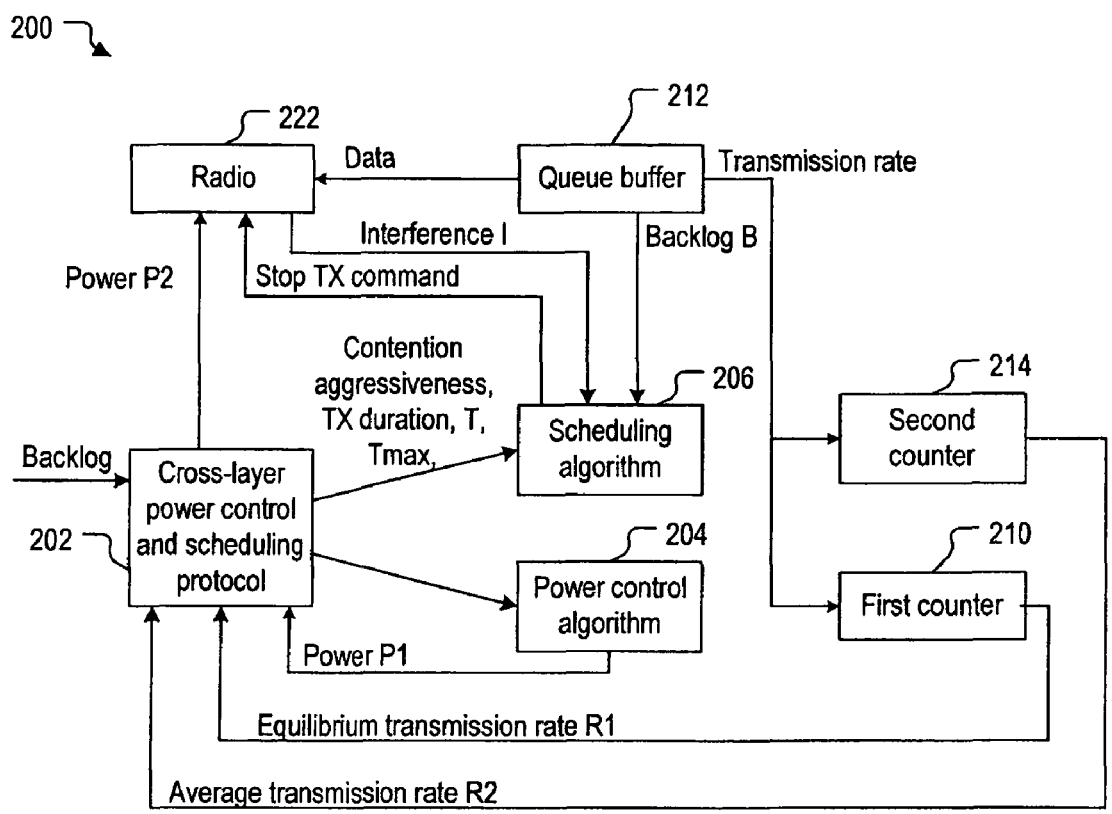
FIG. 2 illustrates a block diagram of modules in a mobile station for transmitting data to a base station in a cellular telephone network.

FIG. 2 illustrates a block diagram of modules in a mobile station 200 for transmitting data to a base station in a cellular telephone network in accordance with at least some embodiments of the present disclosure. The described modules may be implemented in software, hardware, or a combination thereof.

Mobile station 200 may include a cross-layer power control and scheduling protocol 202 that may operate the mobile station in a pure power mode using a power control algorithm 204 or a time sharing mode using both the power control algorithm 204 and a scheduling algorithm 206. Power control algorithm 204 may be a conventional power control algorithm such as DPC algorithm and its variants for variable SIR assignment. Power control algorithm 204 may provide a transmission power P1 to protocol 202, which then may set a transmission power P2 of radio 222 based on transmission power P1. Radio 222 may transmit data to a base station using transmission power P2.

Scheduling algorithm 206 may be based on a conventional scheduling algorithm such as the carrier sensing multiple access (CSMA) algorithm and the Aloha algorithm. Protocol 202 may adjust the contention aggressiveness and the transmit duration of scheduling algorithm 206 based on the backlog B of a queue buffer 212 to radio 222. Contention aggressiveness refers to how often scheduling algorithm 206 contends for a channel. Transmit duration refers to how long scheduling algorithm 206 holds the channel once it succeeds in contending for it. Protocol 202 may increase the contention aggressiveness, the transmit duration, or both as the backlog B of queue buffer 212 increases.

While holding the channel for transmission, scheduling algorithm 206 may randomly select a start time for a silence period T over a time horizon Tmax and may cause radio 222 to stop transmitting during the silence period. Outside the silence period T, radio 222 may transmit the data using transmission power P2 from protocol 202. Scheduling algorithm 206 may receive the durations for silence period T and time horizon Tmax from protocol 202. The duration of time horizon Tmax may be the same for all the mobile stations. The duration of silence period T may be determined by each mobile station based on (1) the backlog B of a queue buffer 212 to radio 222, and (2) the measured interference level I detected by radio 222. In some embodiments, the duration of silence period T may be defined as follows:

$$T = \text{alpha} * I/B, \quad (1.0)$$

where alpha is a scaling constant common across all mobile stations. The constant alpha may be based on (1) the largest buffer size in all the mobile stations and (2) the largest interference level tolerated by the base station. The constant alpha allows silence period T for each mobile station to be bigger than one time slot and smaller than time horizon Tmax.

Protocol 202 may initially run power control algorithm 204 until the transmission rate of queue buffer 212 reaches a state of equilibrium. A first counter 210 may monitor the transmission rate under power control algorithm 204. When the transmission rate reaches the state of equilibrium, the first counter 210 may provide the equilibrium transmission rate R1 to protocol 202.

After the transmission rate reaches the state of equilibrium, protocol 202 may run a detection trial using both power control algorithm 204 and scheduling algorithm 206. Whereas power control algorithm 204 may be used to determine the transmission power of radio 222, scheduling algorithm 206 may be used to determine when to stop the radio from transmitting. A second counter 214 may monitor the transmission rate of queue buffer 212 during the detection trial. At the end of the detection trial, the second counter 214 may provide the average transmission rate R2 during the detection trial to protocol 202.

After the detection trial, protocol 202 may determine if it should operate mobile station 200 in a pure power mode using the power control algorithm 204 or in a time sharing mode using both the power control algorithm 204 and the scheduling algorithm 206. When equilibrium transmission rate R1 is greater than or equal to average transmission rate R2, protocol 202 may operate mobile station 200 in the pure power mode. When average transmission rate R2 is greater than equilibrium transmission rate R1, protocol 202 may operate mobile station 200 in the time sharing mode. In the time sharing mode, mobile station 200 may randomly stop transmitting for silence period T over time horizon Tmax.

As described above, protocol 302 may set the transmission power P2 of radio 222 based on the transmission power P1 from the power control algorithm 304. Protocol 302 may set transmission power P2 equal to transmission power P1 by default. In the pure power mode, protocol 302 may increases transmission power P2 over transmission power P1 whenever the backlog of queue buffer 312 exceeds various thresholds described below.

Figure 3:
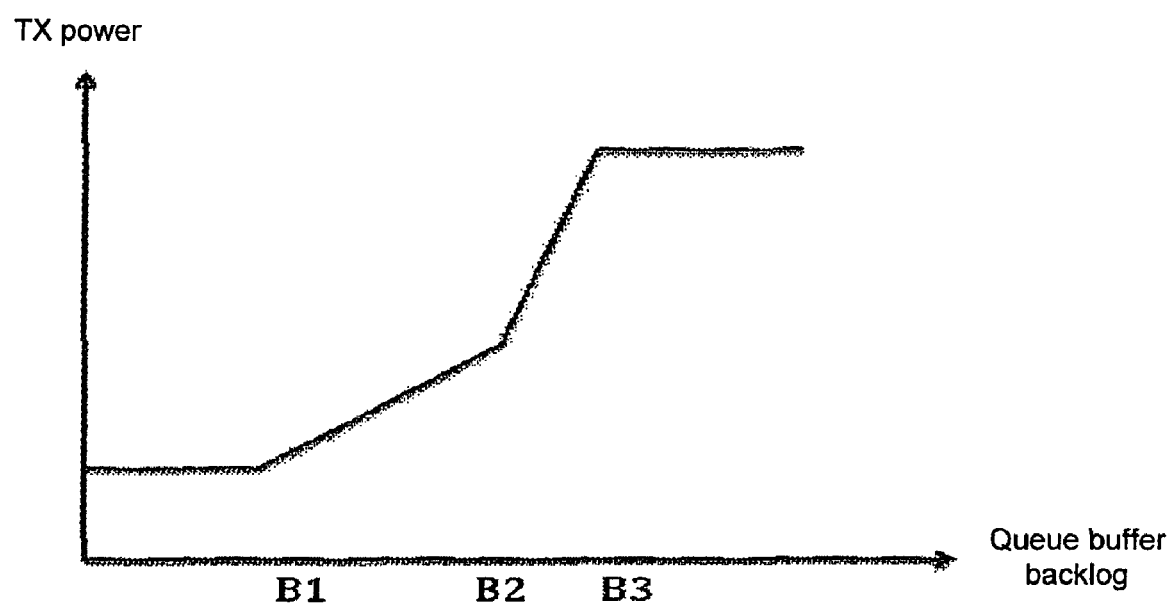
FIG. 3 is a chart demonstrating a buffer-aware power control operation executed by a cross-layer protocol.

FIG. 3 is a chart demonstrating a buffer-aware power control operation executed by a cross-layer protocol in accordance with at least some embodiments of the present disclosure. As illustrated, the x-axis represents backlog B of queue buffer 212 and the y-axis represents transmission (TX) power P2. For illustrative purpose, transmission power P1 is held constant.

Before queue buffer 212 reaches a minimum backlog level B1, protocol 202 may set transmission power P2 equal to transmission power P1 so the power level is determined entirely by power control algorithm 204. Between buffer levels B1 and B2, protocol 202 may add a first increment to transmission power P1 where the first increment increases as the backlog level increases. Between buffer levels B2 and B3, protocol 302 may add a second increment to transmission power P1 where the second increment increases at a faster rate than the first increment. After buffer level B3, the maximum transmission power is reached so no additional increment in power may be added. Although two regions of increments are shown in FIG. 3, additional regions can be added in other embodiments.

Figure 4:
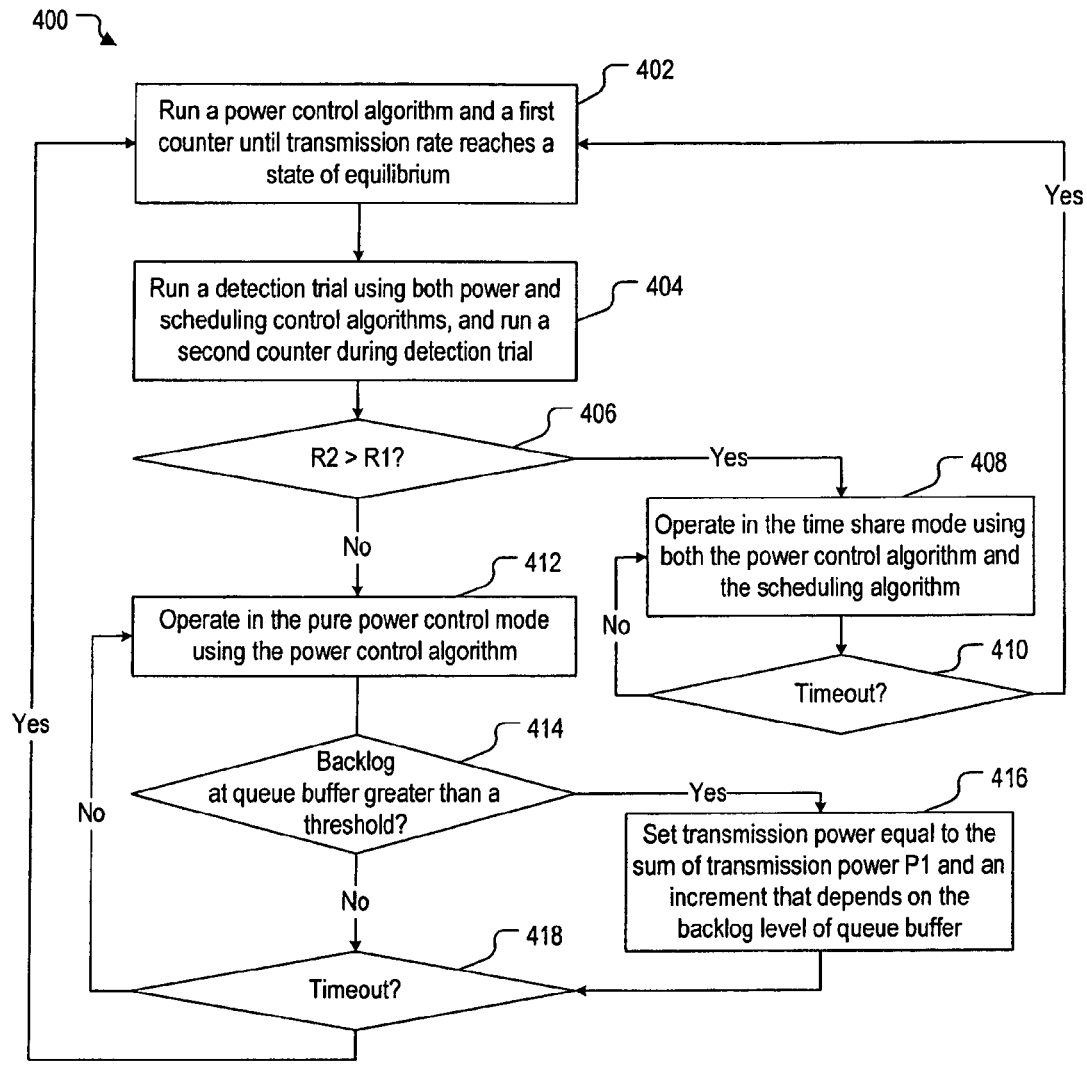
FIG. 4 is a flowchart of a method for a cross-layer protocol executed by a processor.

FIG. 4 is a flowchart of a method 400 for a cross-layer protocol 202 executed by a processor 102, in accordance with at least some embodiments of the present disclosure.

Processing for method 400 begins at operation 402, where protocol 202 may run a power control algorithm 204 and a first counter 210 until the transmission rate of queue buffer 212 reaches a state of equilibrium. During this time, protocol 202 may set transmission power P2 of radio 222 equal to transmission power P1, which may be provided by the power control algorithm 204. First counter 210 may determine the equilibrium transmission rate R1 and may provide it to protocol 202. Operation 402 may be followed by operation 404.

In operation 404, protocol 202 may run a detection trial using both power control algorithm 204 and scheduling algorithm 206. Protocol 202 may also run a second counter 214 during the detection trial. During the detection trial, scheduling algorithm 206 may randomly stop data transmission for silence period T over time horizon Tmax. As described above, the duration of the silence period T may be determined by each mobile station based on (1) backlog B of its queue buffer 212 and (2) the measured interference level I detected by radio 222. Outside of silence period T, protocol 202 may continue to set transmission power P2 equal to transmission power P1. Second counter 214 may determine the average transmission rate R2 during the detection trial and provide it to protocol 202. Operation 404 may be followed by operation 406.

In operation 406, protocol 202 may determine if the average transmission rate R2 is greater than the equilibrium transmission rate R1. Operation 406 may be followed by operation 408 where protocol 202 operates in the time sharing mode when the average transmission rate R2 is greater than the equilibrium transmission rate R1. Otherwise operation 406 may be followed by operation 412 where protocol 202 operates in the pure power control mode when the average transmission rate R2 fails to exceed the equilibrium transmission rate R1.

In operation 408, protocol 202 may operate in the time sharing mode using both power control algorithm 204 and scheduling algorithm 206. Operation 408 may be followed by operation 410.

In operation 410, protocol 202 may determine if a timeout (e.g., 3 minutes) has expired. If the timeout has expired, operation 410 may be followed by operation 402 to determine if a shift between modes is needed. Otherwise operation 410 may loop back to operation 408 so protocol 202 may continue to operate in the time sharing mode.

In operation 412, protocol 202 may operate in the pure power mode using the power control algorithm 204. Operation 412 may be followed by operation 414. In the pure power mode, protocol 202 may initially set transmission power P2 of radio 222 equal to transmission power P1 provided by power control algorithm 204.

In operation 414, protocol 202 may determine if backlog B of queue buffer 212 exceeds minimum backlog level B1. If the minimum backlog level B1 is exceeded, then operation 414 may be followed by operation 416. Otherwise operation 414 may be followed by operation 418 when the minimum backlog level B1 is not exceeded.

In operation 416, protocol 202 may set transmission power P2 equal to the sum of transmission power P1 and an increment that depends on the backlog level of queue buffer 212. As described above with FIG. 4, protocol 202 may use a first increment when the backlog is between levels B1 and B2, and a second increment when the backlog is between levels B2 and B3. Operation 216 may be followed by operation 218.

In operation 218, protocol 202 may determine if a timeout (e.g., 3 minutes) has expired. If the timeout has expired, then operation 218 may be followed by operation 202 to determine if a shift between modes is needed. Otherwise operation 218 may loop back to operation 214 so protocol 202 may continue to operate in the pure power mode.

As described above, method 400 may provide a detection trial that allows a mobile station to try out the possibility of time-sharing rather than nonstop transmission and interference managed by power control. Fully autonomous operation may be maintained, and mobile stations may distributively determine if each should try out a longer or shorter period of time-sharing based on the perceived interference level and the buffer size. Note that higher interference may mean that a mobile station could have more incentive to go to a time-sharing model while a larger buffer may mean that the mobile station may have more urgency to transmit and cannot afford to be silent for too long. Method 400 may also enable the mobile stations to determine after the detection trial if it should operate in the pure power control mode or shift to the time sharing mode. Finally, even in the pure power control mode, method 400 may allow the urgency of packet transmission to have an additive effect on power level, thus allowing power control to interact better with delay-sensitive applications and to better ensure queue stability.

Figure 5:
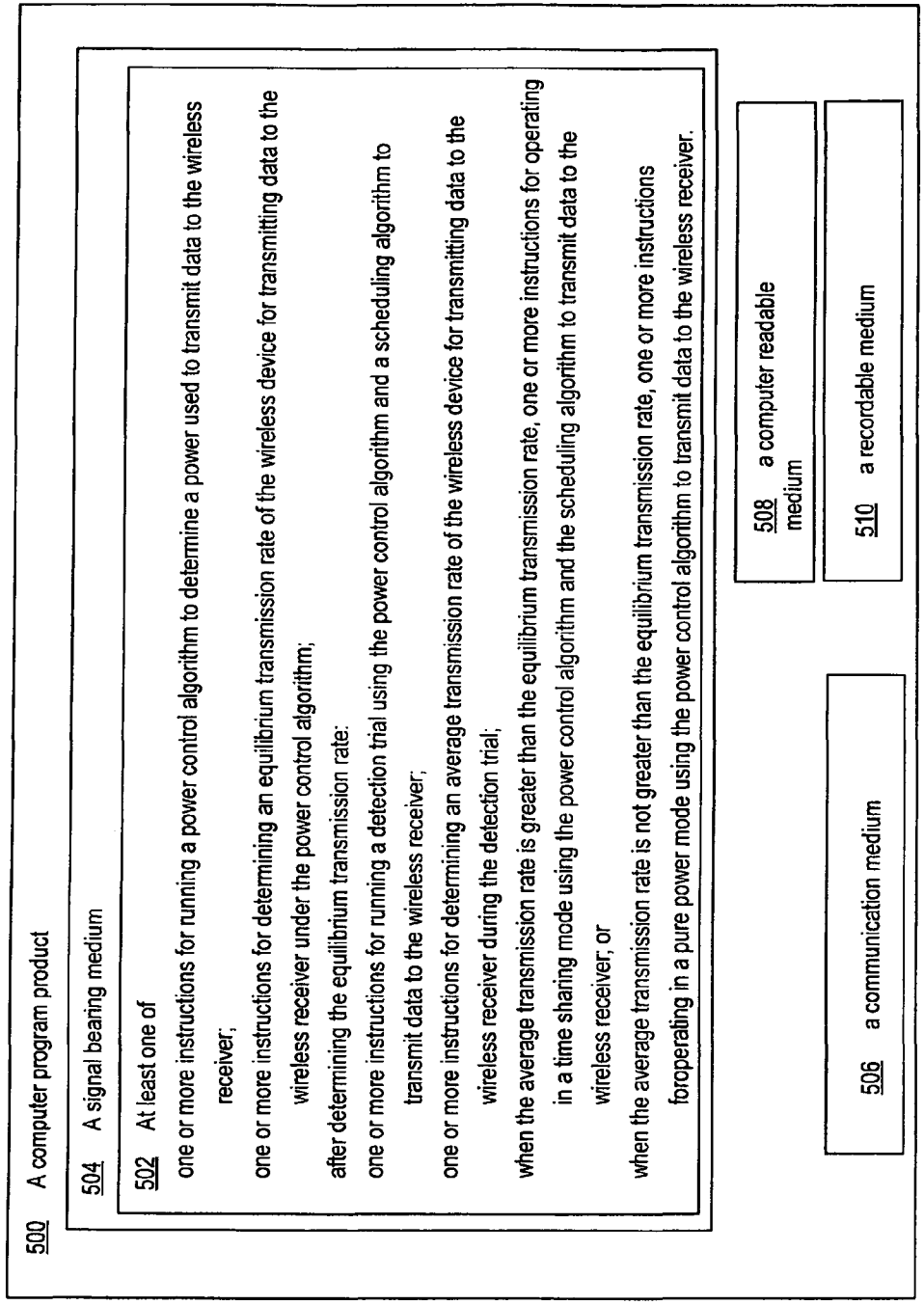
FIG. 5 is a block diagram illustrating a computer program product of the software modules in the mobile station, all arranged in accordance with at least some embodiments of the present disclosure.

FIG. 5 is a block diagram illustrating a computer program product 500 of the modules for a mobile station 200, arranged in accordance with at least some embodiments of the present disclosure. Computer program product 500 may include one or more sets of instructions 502 for executing the methods of the modules for mobile station 200. Computer program product 500 may be transmitted in a signal bearing medium 504 or another similar communication medium 506. Computer program product 500 may be recorded in a computer readable medium 508 or another similar recordable medium 510.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for a wireless device to jointly control transmit power and transmit time to transmit data via wireless communications to a wireless receiver in a wireless network, the wireless network including multiple wireless devices including the wireless device, the method comprising:
running a power control algorithm to determine a power used to transmit data to the wireless receiver;
determining an equilibrium transmission rate of the wireless device for transmitting data to the wireless receiver under the power control algorithm;
after determining the equilibrium transmission rate:
running a detection trial using the power control algorithm and a scheduling algorithm to transmit data to the wireless receiver;
determining an average transmission rate of the wireless device for transmitting data to the wireless receiver during the detection trial;
when the average transmission rate is greater than the equilibrium transmission rate, operating in a time sharing mode using the power control algorithm and the scheduling algorithm to transmit data to the wireless receiver; and
when the average transmission rate is not greater than the equilibrium transmission rate, operating in a pure power mode using the power control algorithm to transmit data to the wireless receiver.

2. The method of claim 1, wherein the scheduling algorithm randomly selects a start time in a time horizon and stops data transmission to the wireless receiver for a silence period from the randomly selected start time in the time horizon.

3. The method of claim 2, wherein the duration of the silence period depends on a backlog of a queue buffer and an interference level.

4. The method of claim 3, wherein the duration of the silence period is defined as T=alpha*I/B, where T is the duration of the silence period, alpha is a scaling constant common to the wireless devices in the wireless network, B is the backlog of the queue buffer, and I is the interference level.

5. The method of claim 4, wherein alpha is based on a largest queue buffer size among the wireless devices in the wireless network and a largest interference level tolerated by the wireless receiver.

6. The method of claim 1, wherein operating in the time sharing mode comprises adjusting a contention aggressiveness of the scheduling algorithm based on a backlog of a queue buffer.

7. The method of claim 1, wherein operating in the time sharing mode comprises adjusting a transmit duration of the scheduling algorithm based on a backlog of a queue buffer.

8. The method of claim 1, wherein operating in the pure power mode comprises adjusting a power set by the power control algorithm based on a backlog of a queue buffer.

9. The method of claim 8, wherein adjusting the power set by the power control algorithm comprises:
when the backlog of the queue buffer is below a first threshold, transmitting data to the wireless receiver with the power set by the power control algorithm; and
when the backlog of the queue buffer is between the first threshold and a second threshold, adding an increment to the power set by the power control algorithm, wherein the increment increases with the backlog.

10. The method of claim 9, wherein adjusting the power set by the power control algorithm further comprises:
when the queue buffer is between the second threshold and a third threshold, adding an other increment to the power set by the power control algorithm, wherein the other increment increases with the backlog at a faster rate than the increment.

11. The method of claim 1, further comprising:
after a timeout expires:
running the power control algorithm to determine the power used for transmitting data to the wireless receiver;

determining an other equilibrium transmission rate of the wireless device for transmitting data to the wireless receiver under the power control algorithm;

running an other detection trial using the power control algorithm and the scheduling algorithm to transmit data to the wireless receiver;

determining an other average transmission rate of the wireless device for transmitting data to the wireless receiver during the other detection trial;

when the other average transmission rate is greater than the other equilibrium transmission rate, operating in the time sharing mode; and when the other average transmission rate is not greater than the other equilibrium transmission rate, operating in the pure power mode.

12. A non-transitory computer-readable storage medium encoded with computer-executable instructions for a wireless device to jointly control transmit power and transmit time to transmit data via wireless communications to a wireless receiver in a wireless network, the wireless network including multiple wireless devices including the wireless device, the instructions comprising:

running a power control algorithm to determine a power used to transmit data to the wireless receiver;

determining an equilibrium transmission rate of the wireless device for transmitting data to the wireless receiver under the power control algorithm;

after determining the equilibrium transmission rate:
running a detection trial using the power control algorithm and a scheduling algorithm to transmit data to the wireless receiver;

determining an average transmission rate of the wireless device for transmitting data to the wireless receiver during the detection trial;

when the average transmission rate is greater than the equilibrium transmission rate, operating in a time sharing mode using the power control algorithm and the scheduling algorithm to transmit data to the wireless receiver; and when the average transmission rate is not greater than the equilibrium transmission rate, operating in a pure power mode using the power control algorithm to transmit data to the wireless receiver.

13. The non-transitory computer-readable storage medium of claim 12, wherein the scheduling algorithm randomly selects a start time in a time horizon and stops data transmission to the wireless receiver for a silence period from the randomly selected start time in the time horizon.

14. The non-transitory computer-readable storage medium of claim 13, wherein the duration of the silence period depends on a backlog of a queue buffer and an interference level.

15. The non-transitory computer-readable storage medium of claim 14, wherein the duration of the silence period is defined as $T=\text{alpha}*I/B$, where T is the duration of the silence period, alpha is a scaling constant common to the wireless devices in the wireless network, B is the backlog of the queue buffer, and I is the interference level.

16. The non-transitory computer-readable storage medium of claim 15, wherein alpha is based on a largest queue buffer size among the wireless devices in the wireless network and a largest interference level tolerated by the wireless receiver.

17. The non-transitory computer-readable storage medium of claim 12, wherein operating in the time sharing mode comprises adjusting a contention aggressiveness of the scheduling algorithm based on a backlog of a queue buffer.

18. The non-transitory computer-readable storage medium of claim 12, wherein operating in the time sharing mode comprises adjusting a transmit duration of the scheduling algorithm based on a backlog of a queue buffer.

19. The non-transitory computer-readable storage medium of claim 12, wherein operating in the pure power mode comprises adjusting a power set by the power control algorithm based on a backlog of a queue buffer.

20. The non-transitory computer-readable storage medium of claim 19, wherein adjusting the power set by the power control algorithm comprises:

when the backlog of the queue buffer is below a first threshold, transmitting data to the wireless receiver with the power set by the power control algorithm; and when the backlog of the queue buffer is between the first threshold and a second threshold, adding an increment to the power set by the power control algorithm, wherein the increment increases with the backlog.

21. The non-transitory computer-readable storage medium of claim 20, wherein adjusting the power set by the power control algorithm further comprises:

when the queue buffer is between the second threshold and a third threshold, adding an other increment to the power set by the power control algorithm, wherein the other increment increases with the backlog at a faster rate than the increment.

22. The non-transitory computer-readable storage medium of claim 12, wherein the instructions further comprises:

after a timeout expires:
running the power control algorithm to determine the power used for transmitting data to the wireless receiver;

determining an other equilibrium transmission rate of the wireless device for transmitting data to the wireless receiver under the power control algorithm;

running an other detection trial using the power control algorithm and the scheduling algorithm to transmit data to the wireless receiver;

determining an other average transmission rate of the wireless device for transmitting data to the wireless receiver during the other detection trial;

when the other average transmission rate is greater than the other equilibrium transmission rate, operating in the time sharing mode; and when the other average transmission rate is not greater than the other equilibrium transmission rate, operating in the pure power mode.

23. A wireless device configured to jointly control transmit power and transmit time to transmit data via wireless communications to a wireless receiver in a wireless network, the wireless network including multiple wireless devices including the wireless device, the wireless device comprising:

a power control algorithm module that determines a transmission power for the wireless device to transmit to the wireless receiver;

a scheduling algorithm module that determines a random time for the wireless device to stop transmitting for a silence period over a time horizon;

a first counter that determines an equilibrium transmission rate;

a second counter that determines an average transmission rate; and a protocol module that operates the first counter and runs the power control algorithm module to determine the equilibrium transmission rate, operates the second counter and runs a detection trial using the power control algorithm module and the scheduling algorithm module to determine the average transmission rate, and operates the wireless device in one of a pure power mode using the power control algorithm module and a time sharing mode using both the power control algorithm module and the scheduling algorithm module based on a comparison of the average transmission rate and the equilibrium transmission rate.

24. The wireless device of claim 23, wherein a duration of the silence period is based on a scaling constant common to the wireless devices in the wireless network, a backlog of a queue buffer, and an interference level detected by the wireless device.

25. The wireless device of claim 24, wherein the scaling constant is based on a largest queue buffer size among the wireless devices and a largest interference level tolerated by the wireless receiver.

26. The wireless device of claim 23, wherein in the time sharing mode, the protocol module adjusts a contention aggressiveness of the scheduling algorithm based on a backlog of a queue buffer.

27. The wireless device of claim 23, wherein in the time sharing mode, the protocol module adjusts a transmit duration of the scheduling algorithm based on a backlog of a queue buffer.

28. The wireless device of claim 23, wherein in the pure power mode, the protocol module increments the transmission power determined by the power control algorithm based on a backlog of a queue buffer.

29. The wireless device of claim 28, wherein the transmission power is incremented by a first rate between first and second backlog thresholds, and by a second rate between the second and a third backlog thresholds.

* * * * *